(12) United States Patent
Bruckner et al.

(10) Patent No.: US 9,245,002 B2
(45) Date of Patent: *Jan. 26, 2016

(54) REPORTING INCLUDING FILLING DATA GAPS AND HANDLING UNCATEGORIZED DATA

(71) Applicant: Microsoft Technology Licensing, LLC, Redmond, WA (US)

(72) Inventors: Robert M. Bruckner, Redmond, WA (US); Christopher A. Hays, Monroe, WA (US); Fang Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,201

(22) Filed: Oct. 1, 2014

(65) Prior Publication Data

US 2015/0058350 A1    Feb. 26, 2015

Related U.S. Application Data

(63) Continuation of application No. 12/394,066, filed on Feb. 27, 2009, now Pat. No. 8,874,576.

(51) Int. Cl.
*G06F 7/00* (2006.01)
*G06F 17/30* (2006.01)

(52) U.S. Cl.
CPC .... *G06F 17/30598* (2013.01); *G06F 17/30941* (2013.01); *G06F 17/30979* (2013.01)

(58) Field of Classification Search
None
See application file for complete search history.

(56) References Cited

U.S. PATENT DOCUMENTS

| | | | |
|---|---|---|---|
| 6,732,085 B1 | 5/2004 | Mozes | |
| 6,820,069 B1 | 11/2004 | Kogan et al. | |
| 6,999,971 B2 | 2/2006 | Latarche et al. | |
| 7,197,696 B1 | 3/2007 | Muzumdar | |
| 7,249,120 B2 | 7/2007 | Bruno et al. | |
| 7,672,877 B1 | 3/2010 | Acton et al. | |
| 2003/0023516 A1* | 1/2003 | Sharrow et al. | 705/28 |
| 2004/0254941 A1 | 12/2004 | Westendorf et al. | |
| 2005/0044094 A1 | 2/2005 | Li et al. | |

(Continued)

OTHER PUBLICATIONS

Non Final Office Action Issued in U.S. Appl. No. 14/608,816, Mailed Date: Apr. 16, 2015, 22 Pages.
Final Office Action Issued in U.S. Appl. No. 12/394,066, Mailed Date: May 23, 2013, 24 Pages.

(Continued)

*Primary Examiner* — Kimberly Wilson
*Assistant Examiner* — Michael Pham
(74) *Attorney, Agent, or Firm* — Nicholas Chen; Micky Mnhas

(57) ABSTRACT

A reporting system is described herein that allows a report author to declare data reporting structures that specify to a reporting application how to dynamically categorize data with changing or potentially unknown characteristics. The reporting system may extend RDL and the data grouping provided by Microsoft SQL Server Reporting Services by adding new elements to the XML-based RDL schema. The reporting system allows the report author to specify for the system to fill gaps in the data, so that the report has a similar layout even as data changes from period to period. The reporting system also allows the report author to specify whether data that does not fit any predefined group bucket is displayed in a report. Thus, the reporting system allows unsophisticated database users to define reports that group data consistently regardless of missing values or other changes in the underlying data.

20 Claims, 3 Drawing Sheets

(56) References Cited

U.S. PATENT DOCUMENTS

| | | | |
|---|---|---|---|
| 2006/0026498 | A1 | 2/2006 | Hays et al. |
| 2006/0048048 | A1 | 3/2006 | Welcker et al. |
| 2006/0064429 | A1 | 3/2006 | Yao |
| 2006/0085744 | A1 | 4/2006 | Hays et al. |
| 2006/0294069 | A1 | 12/2006 | Carlson et al. |
| 2007/0011177 | A1* | 1/2007 | Sol et al. .................. 707/100 |
| 2007/0055661 | A1 | 3/2007 | Witkowski et al. |
| 2007/0055943 | A1 | 3/2007 | Mccormack et al. |
| 2007/0179975 | A1 | 8/2007 | Teh et al. |
| 2007/0256028 | A1 | 11/2007 | Hays et al. |
| 2008/0005197 | A1 | 1/2008 | Chang et al. |
| 2008/0016086 | A1* | 1/2008 | Chang et al. .................. 707/100 |
| 2008/0027957 | A1 | 1/2008 | Bruckner et al. |
| 2008/0052271 | A1 | 2/2008 | Lam |
| 2008/0086495 | A1 | 4/2008 | Kiziltunc et al. |
| 2008/0201309 | A1 | 8/2008 | Baumgartner et al. |
| 2009/0327212 | A1* | 12/2009 | Bell et al. ...................... 707/2 |

OTHER PUBLICATIONS

Final Office Action Issued in U.S. Appl. No. 12/394,066, Mailed Date: Feb. 17, 2012, 27 Pages.

Aug. 27, 2015 Non-Final Office Action Issued in U.S. Appl. No. 12/394,066, Mailed Date: Jun. 27, 2011, 18 Pages.

Non-Final Office Action Issued in U.S. Appl. No. 12/394,066, Mailed Date: Oct. 4, 2013, 22 Pages.

Non-Final Office Action Issued in U.S. Appl. No. 12/394,066, Mailed Date: Oct. 9, 2012, 25 Pages.

Margahny, et al., "Fast Algorithm for Mining Association Rules", In Conference Proceedings of AIML, CICCC, Dec. 19-21, 2005, 5 Pages.

Nag, et al., "Caching for Multi-Dimensional Data Mining Queries", In Proceedings of SCI, 2001, 6 Pages.

"13 Advanced Programming Techniques", Published on: Nov. 24, 2008, Available at: <http://download.oracle.com/docs/cd/B25329_01/doc/appdev.102/b25309/advnc.htm>, 25 pages.

* cited by examiner

REPORTING INCLUDING FILLING DATA GAPS AND HANDLING UNCATEGORIZED DATA

CROSS-REFERENCE TO RELATED APPLICATIONS

This application is a continuation of U.S. patent application Ser. No. 12/394,066, filed Feb. 27, 2009, the entirety of which is incorporated by reference herein.

BACKGROUND

A report is a combination of three kinds of information: 1) information about how to obtain data (queries) as well as the structure of the data, 2) layout or formatting information that describes how to present the data, and 3) additional informational properties, such as author, parameters, images within the report, and so on. In today's database reporting market, most applications use a proprietary format for representing the definition of a report. In addition, vendors that provide a report execution environment usually only support their own design tools. For customers, this means that customers cannot easily move reports between different reporting implementations and that there are few options for choosing new tools that work with existing execution environments.

Report Definition Language (RDL) is a standard proposed by Microsoft for defining reports. RDL is an XML schema used with Microsoft SQL Server Reporting Services. Report authors usually write RDL using Microsoft Visual Studio, although there are also third-party tools; authors may also create or edit RDL in a text editor such as Microsoft Notepad. Microsoft Reporting Services and 3rd party reporting frameworks use RDL to define charts, graphs, calculations, text, images, and other report objects and to render report objects in a variety of formats.

One goal of RDL is to promote the interoperability of commercial reporting products by defining a common schema that allows interchange of report definitions. RDL is a schema definition, not a programmatic interface or protocol like HTTP or ODBC. RDL does not specify how applications pass report definitions between applications or how applications process reports. In addition, RDL is fully encapsulated, meaning that successfully interpreting an RDL document does not involve any understanding of the source application. RDL is also designed to be output format neutral, meaning that reports defined using RDL can be output to a variety of formats including Web and print-ready formats or data-focused formats like XML. In the process of generating different output formats, products may represent RDL constructs slightly differently or ignore certain constructs completely. For example, a product generating a textual format may choose to ignore images in a report.

When reporting data, there are commonly cases where a report user wants to group and aggregate the data, such as to help the report user identify trends in the data. Often, reports include a predefined set of categories, or groups, into which a reporting application places data. For example, predefined layouts may include data for every month of a year. Sometimes however, straightforward grouping and aggregation is insufficient, particularly when dealing with changing or unknown data characteristics. Report users often have a different skill set than database designers, and cannot simply modify queries in a data source (e.g., a database) to define a different report. Having database designers modify queries is expensive. In addition, a report user may want to generate a report from a third party database for which the report user does not interact with the database owner and for which modifying the data source is not an option.

SUMMARY

A reporting system is described herein that allows a report author to declare data reporting structures that specify to a reporting application how to dynamically categorize data with changing or potentially unknown characteristics. In some embodiments, the reporting system extends RDL and the data grouping provided by Microsoft SQL Server Reporting Services by adding new elements to the XML-based RDL schema. Gaps in the data are also common, and the user may want to see a consistent report each month regardless of whether there is data for a given interval. The reporting system allows the report author to specify for the system to fill gaps in the data, so that the report has a similar layout even as data changes from period to period. Another common problem is that the report author may want to see data that falls outside of predefined categories. Thus, the reporting system allows unsophisticated database users to define reports that group data consistently regardless of missing values or other changes in the underlying data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A reporting system is described herein that allows a report author to declare data reporting structures that specify to a reporting application how to dynamically categorize data with changing or potentially unknown characteristics. In some embodiments, the reporting system extends RDL and the data grouping provided by Microsoft SQL Server Reporting Services by adding new elements to the XML-based RDL schema. In current data grouping, each group definition contains a list of group expressions by which to group the data. If a group expression is not defined then every data row becomes its own group (i.e., a "detail group"). Existing RDL grouping works well for defining groups for discrete data. For example, for rows of data containing a country and a state, it is possible to group by country, then by state. However, grouping becomes more difficult for numeric data. Numeric data is often not discrete and often contains abstract concepts that are not immediately apparent from the data without higher level, outside knowledge. For example, a report author (e.g., a report user) may want to group customer data by monthly dollar amount of sales (e.g., $0-10,000, $10,000-20,000, etc.) and a particular interval may be significant to the user. In some embodiments, the system adds a new element called <Bucketing> under <Group> which, if present, is used to place the data from the groups into group buckets. The reporting system introduces three main types of group buckets: range (including scalar), array, and custom group buckets.

Gaps in the data are also common, and the user may want to see a consistent report each month regardless of whether there is data for a given interval. For example, one month there may be one customer with sales in the $0-10,000 range, no customers with sales in the $10,000-20,000 range, and two customers with sales above $20,000. To a report author, seeing what data is not present can be as interesting for making decisions as seeing what data is present. For example, gaps may indicate errors in data collection, failure to market to a particular group, and so forth. The reporting system allows the report author to specify for the system to fill gaps in the data, so that the report has a similar layout even as data changes from period to period. Another common problem is that the report author may want to see data that falls outside of predefined categories. For example, if the report author defines sales ranges up to $20,000, then the system may create a group bucket for data above $20,000. The report author can use this data in a report to detect missed categories in the report, erroneous (e.g., out of bound) data reported by a data source, and so forth. Thus, the reporting system allows unsophisticated database users to define reports that group data consistently regardless of missing values or other changes in the underlying data.

Figure 1:
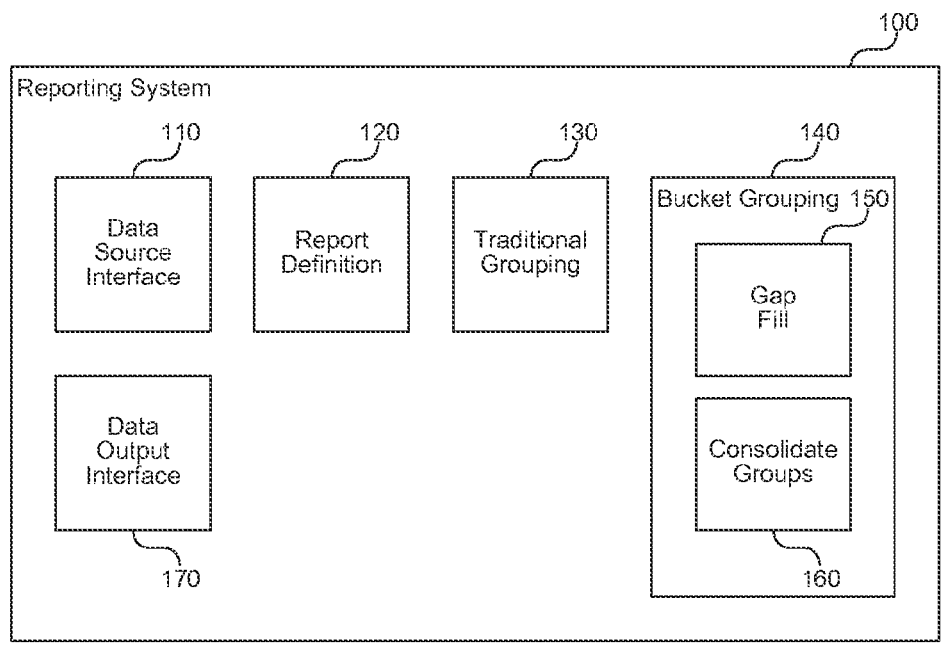
FIG. 1 is a block diagram that illustrates components of the reporting system, in one embodiment.

FIG. 1 is a block diagram that illustrates components of the reporting system, in one embodiment. The reporting system 100 includes a data source interface 110, a report definition component 120, a traditional grouping component 130, a bucket grouping component 140, and a data output interface 170. The bucket grouping component 140 includes a gap fill component 150 and a consolidate groups component 160. Each of these components is described in further detail herein.

The data source interface 110 manages interaction between data sources and the reporting system. The data source interface 110 allows the reporting system to receive data from a wide variety of data sources. In some embodiments, the data source interface 110 can interact with any data source that has an ADO.NET data provider. ADO.NET provides common interfaces for data providers to communicate with applications, and software developers have created ADO.NET data providers for many different types of data sources. The data source interface 110 can leverage this by invoking the common interfaces to receive data from many different data sources. Data may be stored in databases, files, across a network (e.g., cloud), and so forth.

The report definition component 120 receives and parses report definitions according to a defined format. For example, the report definition component 120 may parse RDL reports that define report elements using XML. The report definition component 120 may map the application-independent concepts of a report defined by an RDL report file and map these concepts to the data of a particular selected data source by invoking the traditional grouping component 130 and bucket grouping component 140. Because the report definition is a declarative specification of how the report author wants the report to appear, the report author does not have to understand the underlying data source.

The traditional grouping component 130 performs traditional grouping available in RDL to create groups of data. The traditional grouping component 130 operates to group data based on distinct categories. The traditional grouping component 130 and bucket grouping component 140 offer complementary manipulation of data that report authors can use in concert to create the type of report containing the data that the report author desires.

The bucket grouping component 140 determines whether received data matches a specific group bucket defined in the report definition. If so, then the bucket grouping component 140 places the data in the appropriate group bucket. If data does not match any group bucket, then the bucket grouping component 140 places the data group in an "other" group bucket. The reporting system can use data mining algorithms to analyze and cluster a dataset by interesting categories. This set of categories is passed as a report parameter to a report, which enables end-users to use the data mining result as guidance for placing data into group buckets (or define custom bucketing ad-hoc at the report execution) and to apply the data mining result to the current user's datasets (which can be different than the original data mining dataset) used in the particular report.

The gap fill component 150 creates group buckets for values of data that are not present in the data source. Although these group buckets will be empty, an empty group bucket may have value for the report author to visualize data irregularities or to ensure a standard report format. For example, the report author may want output that is seven columns for each day of the week, regardless of whether the data contains rows matching each particular day. The gap fill component 150 allows the report format to be independent of the data, rather than driven by the data as in many traditional reporting systems.

The consolidate groups component 160 performs any post-processing of the group buckets determined by the report definition. For example, the system may allow one "other" group bucket to contain all non-matching values or may keep non-matching values ungrouped. The consolidate groups component 160 gathers non-matching data into one "other" group bucket if specified by the report definition.

The data output interface 170 renders the result of grouping and bucketing data to a selected output device, based on layout instructions in the report definition. For example, the data output interface 170 may provide the results in a print format for paper or the Web, in a data format such as XML, or programmatically through a data-reading interface. The data output interface 170 can even act as a data provider for other systems, processing data intermediately in the ways described herein, and then passing the processed data to other components for further processing.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
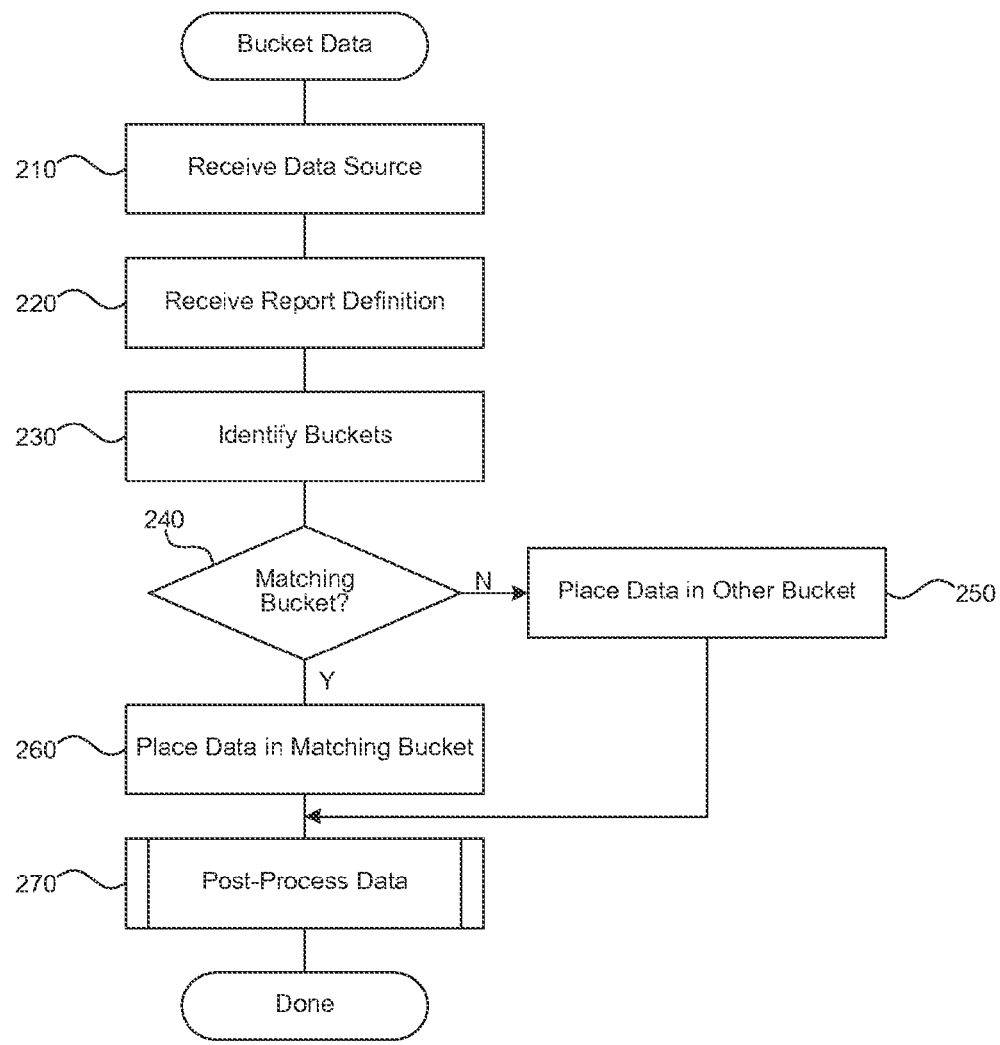
FIG. 2 is a flow diagram that illustrates the processing of the bucket grouping component to categorize groups of data, in one embodiment.

FIG. 2 is a flow diagram that illustrates the processing of the bucket grouping component to categorize groups of data, in one embodiment. In block 210, the component receives an identification of a data source. For example, an application or user may provide a file path for opening a data file or a connection string for accessing data stored remotely. Continuing in block 220, the component receives a report definition that describes the contents of a report. For example, the report definition may include an RDL-based file that describes how data from the received data source is grouped and manipulated when the component generates a report. Continuing in block 230, the component receives the data and determines one or more group buckets identified by the report definition into which to place groups of data. For example, the report definition may specify ranges of source data or discrete data values that belong to a particular group bucket. The report definition may also specify how to handle missing data or data that does not fit into any predefined group bucket.

Continuing in decision block 240, if the component receives data that does not fit into a predefined group bucket then the component continues at block 250, else the component continues in block 260. In block 250, the component places the data into a group bucket for holding uncategorized data. For example, the component may store the data in an "other" group bucket that holds data that does not fit a predefined group bucket. In block 260, the component places the data in the appropriate group bucket. For example, if the report definition identifies a range of values that fall into a group bucket and a row of data is within the range, then the component places the row into the group bucket. The component repeats (not shown) the steps of blocks 240-260 for each row of data received. Current (and parent) group expressions defined on RDL group elements in the grouping hierarchy already perform a grouping of data rows. Consequently, the bucketing performed by the system is not limited to individual rows, but applies the same way to group instances that can represent multiple rows. Thus, although the system may perform bucketing for each row (e.g., in the case of a detail group with every row being its own group instance), the system typically operates on groups instances of multiple rows. After block 260, the component continues in block 270. Continuing in block 270, the component performs any postprocessing of data or invokes other components to perform additional manipulation of the bucketed data. This step is described further with reference to FIG. 3. After block 270, these steps conclude.

Figure 3:
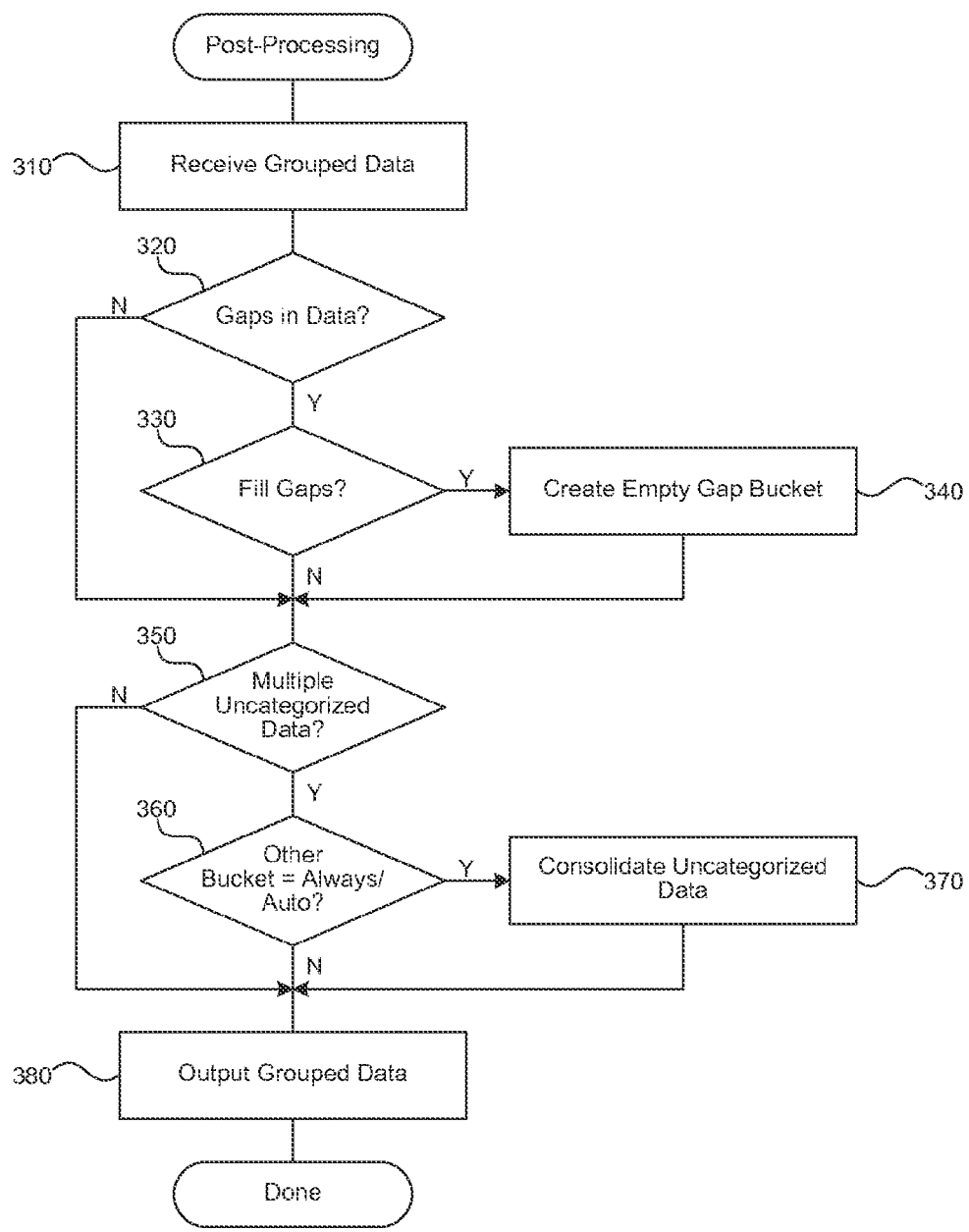
FIG. 3 is a flow diagram that illustrates the processing of the consolidate groups component, in one embodiment.

FIG. 3 is a flow diagram that illustrates the processing of the consolidate groups component, in one embodiment. In block 310, the component receives data processed by the traditional grouping component and the bucket grouping component. The data may come from a variety of sources and is grouped and placed in group buckets according to characteristics of the data specified in a report definition. Continuing in decision block 320, if there are gaps in the received data, then the component continues at block 330, else the component continues at block 350. Continuing in decision block 330, if the "FillGaps" setting is active, then the component continues at block 340, else the component continues at block 350. Continuing in block 340, the component creates an empty group bucket in the gap. Block 340 may create an empty group bucket for each gap or the component may repeat the steps of blocks 320-340 for each group bucket defined in the report definition. For example, if the report definition specifies a group bucket for the range 10-20 of some data value, and there is no data for the 10-20 group bucket, the component inserts a 10-20 group bucket that is empty so that it will be included in the report and the report will not contain gaps. Empty group buckets may only exist in a virtual/logical way, and actually not be physically materialized by the system (e.g., presented by an API exposed by the system but not actually stored). While the end-user cannot tell the difference from the rendered report, this may allow more efficient memory usage and better performance.

Continuing in decision block 350, if the data contains multiple uncategorized groups of data, then the component continues at block 360, else the component continues at block 380. Continuing in decision block 360, if the OtherBucket option is set to Always or Auto (described further herein), then the component continues at block 370, else the component continues at block 380. Continuing in block 370, the component consolidates each item of uncategorized data into a single "other" group bucket. For example, if the report definition defines ranges of data values from 10-20, 30-40, and 50-60, then the data after the processing of FIG. 2 may contain uncategorized data in the ranges 20-30, 40-50, and 60+. The component consolidates these ranges into a single group bucket if requested by the report definition.

Continuing in block 380, the component outputs the grouped data to a specified output device or location. For example, an application invoking the report may specify the location for storing the output as a known format, such as HTML, XML, or other format for further consumption. The output of the component may be displayed to the user or may be consumed by application programs or stored (e.g., on a hard drive) for later use. If the report definition specifies multiple nested grouping and/or bucketing steps, then the component may repeat the processes of FIGS. 2 and 3 again before displaying the result to the user. After block 380, these steps conclude.

The reporting system is not limited to any one type of data source. Applications can supply data to the system in a variety of formats, such as database query output using a variety of protocols (ODBC, ADO, and so forth). The system can also receive data through XML, data files, Microsoft .NET data providers, and so forth. Data sources may include data that is relational (e.g. SQL Server, Oracle), multi-dimensional (e.g. Analysis Services), semi-structured (e.g. XML), unstructured (e.g. Excel, text files), and even spatial datasets. In case of spatial data, report authors can define the group buckets as geographical "shapes" (e.g. the shape/coordinates of the U.S.) and the system will categorize and bucket the original spatial dataset based on the geographical "contains" relationship for the shape. Regardless of the initial format, the reporting system matches identifiers (e.g., column names) in the data source with identifiers in the report definition and groups the data according to the report definition. The reporting system can also display data in a variety of formats, such as text, graphics, charts, XML, and so forth.

In some embodiments, the reporting system provides a programmatic interface through which application authors can access the group buckets and other data groupings defined by a report definition. For example, the system may provide a Microsoft .NET API for enumerating group buckets, accessing group bucket information, and displaying group bucket data. The reporting system may present bucketed data in a traditional data source format that is familiar to application authors, such as ADO or XML.

In some embodiments, the reporting system permits nesting of grouping and bucketing elements, so that the results of one grouping or bucketing can be used in further levels of grouping and/or bucketing. For example, an initial level of a report definition may group data by geographical regions, while later levels may group the geographical regions by day of week numbers for sales. Report authors can develop complex reports for a variety of purposes by repeating the concepts described herein over multiple levels using nesting.

Following is example syntax in embodiments where the reporting system is implemented as an extension to RDL. The Grouping, GroupExpressions, and Expression elements exist in RDL today, while the Bucketing element and sub elements are added as part of the reporting system.

```
<Grouping>
    <GroupExpressions>
        <GroupExpression>
            <Expression>        [0. .N occurrences]
            ...
            </Expression>
            <Bucketing>
                <FillGaps/>
                <OtherBucket/>
                <AutoRange>     [mutex with Array, CustomBuckets]
                    <Min/>
                    <Max/>
                    <StartAt/>
                    <Interval>
                    <IntervalType/>
                </AutoRange>
                <Array>         [mutex with CustomBuckets]
                    ...         [RDL array result expression]
                </Array>
                <CustomBuckets>
                    <Range>     [0..N of these]
                        <Min/>
                        <Max/>
                    </Range>
                    <Items>     [mixed with 0..N of these]
                        <Item/>
                        <Item/>
                    </Items>
                </CustomBuckets>
            </Bucketing>
        </GroupExpression>
        ...
    </GroupExpressions>
</Grouping>
```

The "FillGaps" element is a Boolean value. If false, the reporting system does not include empty group buckets (e.g., those for which the data source currently contains no data) in the final set of group buckets. If true, the reporting system does include empty group buckets (either explicitly defined array buckets or custom buckets, or implicitly representing gaps in scalar value ranges). For example, if a report author defines a report that displays sales from an ecommerce website grouped by day of the week, and there were no sales on Thursday for a given week, then the FillGaps element determines whether Thursday is displayed in the report. If the report author wants a consistent report regardless of whether a given day had sales in a particular week, then the author can turn FillGaps on so that each day is included in the report, even when there is no data from the data source for that day.

The OtherBucket element is an enumeration with values: "Never," "Always," "Auto," "Discrete." If the report author specifies "Never," then the reporting system discards data (or groups of data) that does not match any group bucket. For example, if a data source contains population data by country and state, and a report author is preparing a report about the United States with group buckets for each state (but no group buckets for non-U.S. states), then the reporting system would not include data for non-U.S. states in the report. If the report author specifies "Always," then the reporting system creates an "other" group bucket to contain data that does not match any other group bucket. Even if the "other" group bucket is empty, the reporting system will include the "other" group bucket in the final set of group buckets. If the report author specifies "Auto," then the reporting system includes the "other" group bucket when the "other" group bucket is not empty. If the report author specifies "Discrete," then the reporting system leaves data that does not match a defined group bucket in place, and does not group the data into one "other" group bucket. Another way of thinking of this is there are 0 . . . N "other" group buckets with this option set.

The AutoRange element and sub elements define a report where the reporting system automatically defines group buckets based on criteria specified by the report author. The Min value is a variant that describes the lowest value for the set of auto-range group buckets. This can be an integer, float, date, or other value. If not specified, the reporting system takes the Min value from the actual data. Similarly, the Max value describes the highest value for the set of auto-range group buckets. The StartAt value is a variant that defines a fixed starting point for the set of auto-range group buckets. For example, a report author can use the StartAt value to achieve well-defined range group buckets (e.g., StartAt=0 and Interval=10, results in auto-ranges of { . . . , [−10, 0), [0-10), [10, 20), . . . }). Note the difference between a square bracket and a round bracket used in this example. The syntax [−10, 0) means that the group bucket matches all groups with values greater or equal to −10 and less than (but not equal to) 0.

The Interval value of the AutoRange element is a variant that defines an interval range that the reporting system uses for individual auto-range group buckets. This can be an integer, float, date interval (year, month, week, day), time interval (hour, minute, second, millisecond), or other value. The IntervalType value is an enumeration that defines the type of the Interval value: number, date interval (year, etc.), time interval (hour, etc.), and so forth. For instance, a report author may want a report with 24 columns to represent each hour of a given day (e.g., revenue analysis for a particular product for an online shopping website). Scalar (auto-range) groups that define a bucketing from 1-24, at interval 1, will ensure that each group instance is present in the report even if there is no data for a particular group bucket.

The Array element contains an RDL expression that evaluates to an object array of array values. Every inner array denotes one group bucket. For example, one definition is [["A," "B"], ["C"], ["D," "E," "F"]]. Given this example, there are three group buckets. The first group bucket contains data with the values "A" or "B," the second group bucket contains data with the value "C," and the third group bucket contains data with the values "D," "E," or "F." For example, for data associated with a particular state in the United States, a report author can use the Array element to create group buckets for a Western region, Southeast region, and so forth, by placing states within a particular region in an array group bucket definition.

The CustomBuckets element is how the reporting system allows where auto-ranges and array bucketing are not sufficient to satisfy the report author. The author can define multiple range group buckets and array group buckets, including arbitrary combinations of both. If the author uses ranges for custom bucketing, Min and Max are optional sub elements. If the author does not specify either of the Min or Max values, the reporting system determines the values from the min/max of the actual data instead. If a report definition specifies Item sub elements, then every Item defined in the collection represents a custom group bucket. In some embodiments, actual group bucket values are available to the report runtime so that an application can show current group bucket values in an appropriate section of the report layout.

Following are several examples of data and grouping using the elements and values described herein. In the first example, a data source reports sales data (potentially already aggregated). The table shown is the result of the following multi-dimensional expression language (MDX) query using SQL Server Analysis Services running against a sample AdventureWorks cube: SELECT NON EMPTY {[Measures].[Order Count]} ON COLUMNS, {[Sales Territory].[Europe], [Sales Territory].[Pacific], [Sales Territory].[Canada], [Sales Territory].[Northeast], [Sales Territory].[Northwest], [Sales Territory].[Southeast], [Sales Territory].[Southwest]} ON ROWS FROM [Adventure Works].

| Sales Region | Count(Orders) |
| --- | --- |
| Europe | 8504 |
| Pacific | 6843 |
| Canada | 4067 |
| Northeast | 352 |
| Northwest | 4594 |
| Southeast | 486 |
| Southwest | 6224 |

The data in the table above is grouped by Sales Region. A report author would like to bucket the groups (e.g. as report parameters) into North America (Northwest, Northeast, Southwest, Southeast, Canada) and Other. In this example, Other would include Europe and Pacific but could include other regions if they exist or if later data contains other regions. To achieve this group bucketing, the report author can define either array or custom bucketing that includes the North America group bucket as [[Northwest, Northeast, Southwest, Southeast, Canada]] and an OtherBucket setting of "Auto" or "Always." The report author can also specify that Europe and Pacific remain stand-alone group buckets using the OtherBucket value "Discrete." The result follows.

| Sales Region | Count (Orders) |
| --- | --- |
| North America | 15723 |
| Other Regions | 15347 |

The second example uses the same data set as the first example. In this example, a report author would like to bucket sales regions by order counts, categorized into ranges of 2000 starting from zero. For this purpose, the report author would apply a group expression of =Count(Orders). In addition the report author would define AutoRange bucketing using the following values: StartAt=0, Interval=2000, and FillGaps=True. Min/Max are not specified, so the reporting system determines their values automatically by the underlying data. The result follows. If in addition the report author specified an explicit Max of 6000, then the "Other" group bucket would contain Pacific, Southwest, and Europe.

| Order volume | Regions |
| --- | --- |
| 0-2000 | Northeast, Southeast |
| 2000-4000 | (Empty) |
| 4000-6000 | Canada, Northwest |
| 6000-8000 | Pacific, Southwest |
| 8000-10000 | Europe |

The third example illustrates custom bucketing and uses a dataset of a survey that includes a question about the age of the survey respondent. A report author might want to group survey responses by age and apply the following custom categories defined as CustomBuckets categories: Child [0-17] (defined as a Range element with Min=0, Max=17), Adult [18-64] (defined as a Range element with Min=18, Max=64), Senior [65+] (defined as a Range element defined as Min=65, no max defined), and Declined to answer (Defined as OtherBucket=Auto). Note that the concept of who is a child or who is an adult is not expressed anywhere within the data, and is a creation of the report author based on the report author's purpose for the data. Thus, the reporting system provides a very powerful way for report authors to visualize data in an easy to define reporting format.

From the foregoing, it will be appreciated that specific embodiments of the system have been described herein for purposes of illustration, but that various modifications may be made without deviating from the spirit and scope of the invention. Accordingly, the invention is not limited except as by the appended claims.

We claim:

1. A computer-implemented method for generating a displayable report, the method comprising:
  receiving a report definition comprising a plurality of user-specified elements;
  parsing the report definition to identify a first user-specified element and a second user-specified element, the first user-specified element specifying a plurality of group buckets to be included in the displayable report and matching criteria respectively associated with each of the group buckets;
  processing data received from a data source to identify multiple data items included therein, and, for each of the data items:
    determining if a data value associated with the data item satisfies the matching criteria respectively associated with each of the group buckets;
    if the data value associated with the data item satisfies the matching criteria associated with a particular one of the group buckets, adding the data item to the particular one of the group buckets; and
    if the data item does not satisfy the matching criteria associated with any of the group buckets, handling the data item in a manner specified by the second user-specified element by selectively performing one of:
      adding the data item to one or one or more uncategorized group buckets to be included in the displayable report; or
      not adding the data item to any group bucket or uncategorized group bucket to be included in the displayable data report.

2. The method of claim 1, wherein receiving the report definition comprises:
  receiving a file having a structure that accords with a schema for generating report definitions.

3. The method of claim 2, wherein receiving the file having a structure that accords with a schema for generating report definitions comprises:
receiving a Report Definition Language (RDL) file.

4. The method of claim 1, wherein the matching criteria respectively associated with each of the group buckets comprises ranges of data values respectively associated with each of the group buckets; and
wherein determining if the data value associated with the data item satisfies the matching criteria respectively associated with each of the group buckets comprises determining if the data value associated with the data item is within the ranges of data values respectively associated with the group buckets.

5. The method of claim 4, wherein the ranges of data values respectively associated with each of the group buckets are automatically determined based on a starting value and an interval included in the first user-specified element.

6. The method of claim 1, wherein the matching criteria respectively associated with each of the group buckets comprises arrays of data values respectively associated with each of the group buckets; and
wherein determining if the data value associated with the data item satisfies the matching criteria respectively associated with each of the group buckets comprises determining if the data value associated with the data item matches any of the data values in the arrays of data value respectively associated with the group buckets.

7. The method of claim 1, wherein the data items comprises rows or groups of rows.

8. The method of claim 1, wherein the second user-specified element specifies that uncategorized group buckets are never to be included in the displayable report.

9. The method of claim 1, wherein the second user-specified element specifies that one or more uncategorized group buckets are always to be included in the displayable report, regardless of whether any data items have been added thereto.

10. The method of claim 1, wherein the second user-specified element specifies that an uncategorized group bucket is to be included in the displayable data report only if at least one data item has been added thereto.

11. The method of claim 1, wherein the second user-specified element specifies that all data items that are not added to the group buckets are to be combined into a single uncategorized group bucket.

12. The method of claim 2, wherein the second user-specified element specifies that each data item that is not added to the group buckets is to be included in its own uncategorized group bucket.

13. A computer system, comprising:
a processor and memory configured to execute software instructions embodied within a set of components as follows;
a data source interface configured to manage interaction between data sources storing data and the computer system and to receive data from at least one of the data sources;
a report definition component configured to receive and parse a report definition that includes a first user-specified element and a second user-specified element, the first user-specified element specifying a plurality of group buckets to be included in a displayable report and matching criteria respectively associated with each of the group buckets;
a bucket grouping component configured to process the received data to identify multiple data items included therein, and, for each of the data items, to determine if a data value associated with the data item satisfies the matching criteria respectively associated with each of the group buckets, to add the data item to a particular one of the group buckets if the data value associated with the data item satisfies the matching criteria associated with the particular one of the group buckets, and to handle the data item in a manner specified by the second user-specified element if the data value associated with the data item does not satisfy the matching criteria associated with any of the group buckets, wherein handling the data item in the manner specified by the second user-specified element comprises selectively performing one of: adding the data item to one or more uncategorized group buckets to be included in the displayable report or not adding the data item to any group bucket or uncategorized group bucket to be included in the displayable data report; and
a data output interface configured to provide the group buckets and any uncategorized group buckets to a selected output device for inclusion in the displayable report.

14. The computer system of claim 13, wherein the data source interface receives data from multiple types of data sources.

15. The computer system of claim 13, wherein the data source interface receives data from an ActiveX Data Objects .NET (ADO.NET) data provider.

16. The computer system of claim 13, wherein the report definition comprises a Report Definition Language (RDL) file that defines includes a plurality of extensible markup language (XML) elements.

17. The computer system of claim 13, wherein the data output interface is further configured to provide the group buckets and any uncategorized group buckets in at least one of a print format, a Web format, an XML format, or a programmatic interface format.

18. A computer-readable memory device comprising instructions for controlling a computer system to automatically generate a displayable report, wherein the instructions, when executed, cause a processor to perform actions comprising:
receiving data from a data source storing the data;
receiving and parsing a report definition comprising a plurality of user-specified elements to identify a first user-specified element and a second user-specified element, the first user-specified element specifying a plurality of group buckets to be included in the displayable report and matching criteria respectively associated with each of the group buckets;
processing the received data to identify multiple data items included therein, and, for each of the data items:
determining if a data value associated with the data item satisfies the matching criteria respectively associated with each of the group buckets;
if the data value associated with the data item satisfies the matching criteria associated with a particular one of the group buckets, adding the data item to the particular one of the group buckets; and
if the data value associated with the data item does not satisfy the matching criteria associated with any of the group buckets, selectively performing one of the following as specified by the second user-specified element:
adding the data item to one or one or more uncategorized group buckets to be included in the displayable report; or discarding the data items such that it is not included in the displayable data report.

19. The computer-readable memory device of claim 18, wherein receiving the report definition comprises receiving a file having a structure that accords with a schema for generating report definitions.

20. The computer-readable memory device of claim 18, wherein the matching criteria respectively associated with each of the group buckets comprises one or more of ranges of data values and arrays of data values.

* * * * *